No. 631,261. Patented Aug. 15, 1899.
T. PATTISON.
WATER HEATER.
(Application filed Feb. 24, 1899.)
(No Model.) 2 Sheets—Sheet 1.
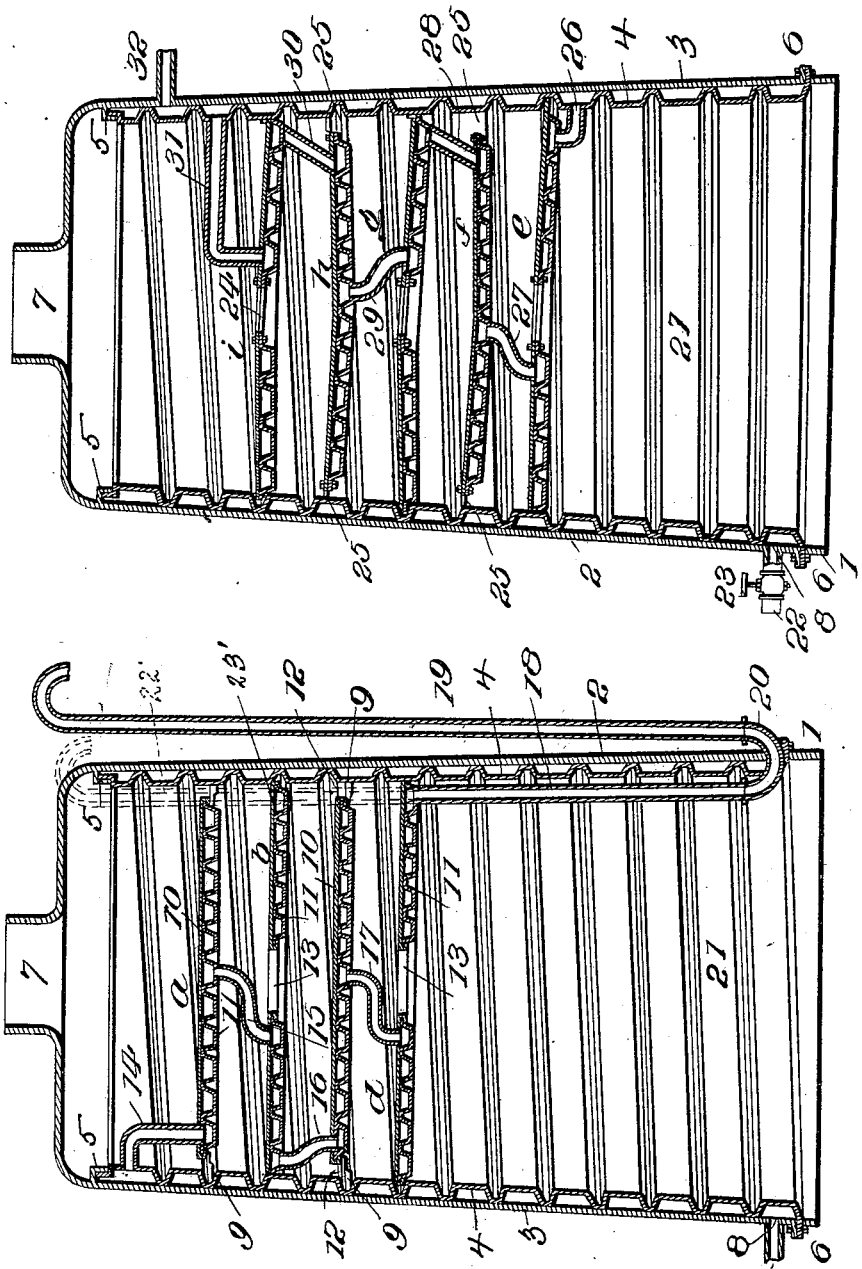
Witnesses
Inventor
Thomas Pattison
By J. R. Nottingham
Attorney
THE NORRIS PETERS CO., PHOTO-LITHO., WASHINGTON, D. C.

No. 631,261. Patented Aug. 15, 1899.
T. PATTISON.
WATER HEATER.
(Application filed Feb. 24, 1899.)
(No Model.) 2 Sheets—Sheet 2.
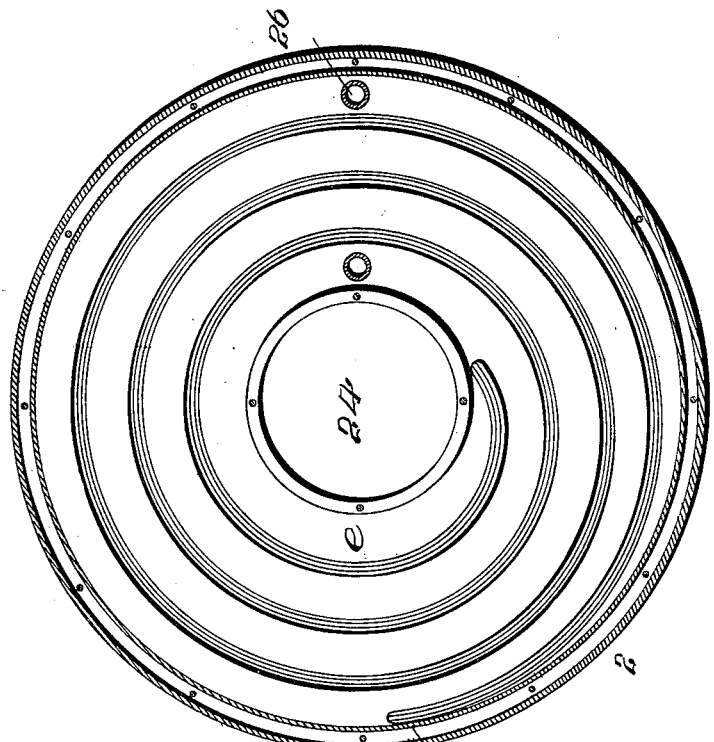
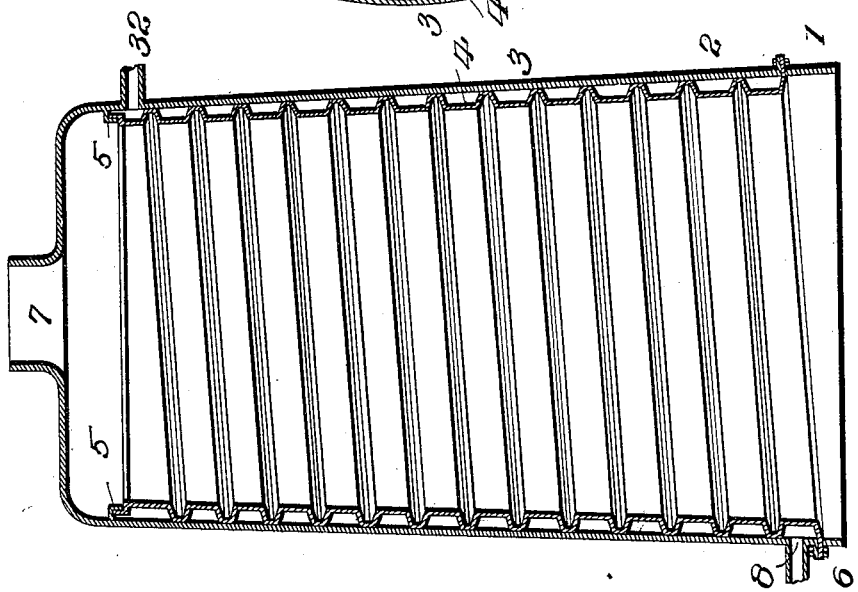
Witnesses
Inventor
Thomas Pattison
By J. R. Nottingham
Attorney

UNITED STATES PATENT OFFICE.

THOMAS PATTISON, OF SAN LUIS OBISPO, CALIFORNIA, ASSIGNOR OF ONE-FOURTH TO CHARLES A. BARLOW, OF SAME PLACE.

WATER-HEATER.

SPECIFICATION forming part of Letters Patent No. 631,261, dated August 15, 1899.

Application filed February 24, 1899. Serial No. 706,695. (No model.)

*To all whom it may concern:*

Be it known that I, THOMAS PATTISON, a citizen of United States, residing at San Luis Obispo, in the county of San Luis Obispo and State of California, have invented certain new and useful Improvements in Water-Heaters; and I do hereby declare the following to be a full, clear, and exact description of the invention, such as will enable others skilled in the art to which it appertains to make and use the same.

My invention relates to that class of heaters known as "instantaneous" water-heaters; and it consists, essentially, in the general construction and arrangement of the parts, as will be hereinafter more particularly described, and pointed out in the claims. In order to secure the best possible results in this class of heaters, it is necessary that the water while passing through the apparatus be subjected to the action of the heat for the maximum length of time, that the products of combustion be retained in the heater until their temperature has been so reduced as to render them uneffective as a heating agent, and that the water-heating sections be so disposed relative to the path of the products of combustion as to present thereto the maximum heat-absorbing surface.

The principal object of this invention, therefore, is to meet these requirements with an apparatus simple in construction and comparatively cheap in manufacture.

Other objects will become apparent on a more detailed description of the invention.

In the accompanying drawings, Figure 1 represents a vertical sectional view of one form of my device; Fig. 2, a similar view of a modified form thereof; Fig. 3, a vertical sectional view of the spirally-chambered shell of the heater with the horizontally-arranged water-heating sections removed and showing the hot-water outlet at the highest point of the heater, and Fig. 4 a bottom plan view of one of the horizontally-disposed water-heating sections.

Referring to the several views, the numeral 1 indicates a suitable base, upon which is supported a vertical spirally-passaged water-heating shell or section 2. This shell is composed of a vertical outer casing 3, preferably cylindrical in form, and an inner casing 4, the latter being spirally grooved on its inner side to form a spiral passage therethrough. The two casings are so connected together that when desired the outer casing may be readily disconnected and lifted from the inner casing for the purpose of removing the scale from the spiral passage. Preferably the inner casing is detachably secured to the outer casing by providing the inner wall of the outer casing with a downwardly-bent flange 5 and inserting the upper edge of the inner casing thereunder and by forming the lower edges of the outer and inner casings with outwardly-extending flanges 6 and bolting them together. The top of the outer casing is provided with an exit 7 for the escape of the products of combustion and near the lower edge with a water-inlet 8, opening into the spiral water-passage at its lowest point.

The inner wall of the shell 2 is provided at suitable distances apart with supports 9, upon which are seated horizontal water-heating sections $a$, $b$, $c$, and $d$. Each section is composed of an upper plate 10 and a lower plate 11, the latter being spirally grooved on its under side to form a spirally-shaped water passage or chamber. The edges of the plates if constructed of sheet metal are locked together by bending the edges of the upper plates over the edges of the lower plates, as shown in Fig. 1; but if constructed of cast metal their edges are bolted together, as shown in Fig. 2. The sections $a$ and $c$ are similar in construction, being somewhat smaller in diameter than the interior of the shell 2 and are arranged so as to form passages 12 between the outer edges of said sections and the vertical water-heating section or shell. The sections $b$ and $d$ are approximately the same diameter as the interior of the shell 2, but are so formed and arranged that passages 13 will be provided through the center thereof, so that the products of combustion will pass upward alternately through and around and over the several horizontal water-heating sections, as indicated by the arrows. By this form and arrangement of the water-heating sections it will be seen that a maximum amount of heat-absorbing surface is obtained. The section *a* communicates with the vertical water-heating section by means of a pipe 14, which enters said vertical section at the upper part of its spiral passage. A pipe 15 connects section *a* with section *b*, and a pipe 16 connects section *b* with section *c*, the latter being in turn connected with section *d* by a pipe 17.

Leading downwardly from the section *d* is an outlet-pipe 18, which is connected to a stand-pipe 19, preferably by means of an elbow 20. The upper end of the stand-pipe extends above the water-line in the heater, so that when the supply of cold water is cut off there will always be water in the heater, and as the passage through said stand-pipe is left open all possibility of accident will be prevented should the gas be lighted or fire started in the combustion-chamber 21.

Any suitable device for applying or generating heat may be employed in connection with my apparatus; but I prefer to use any burner suitable for burning gas or hydrocarbon oils, such burner (not shown) being located in the chamber 21 below the horizontal water-heating section.

The water enters the spirally-passaged shell or vertical heating-section through the supply-pipe 22, which is provided with a suitable cut-off valve 23, and, rising to the top of the shell, flows through pipe 14 into the horizontal section *a*. From section *a* it flows through pipe 15 into section *b*, from section *b* through pipe 16 into section *c*, and from section *c* through pipe 17 into section *d*. After filling this section the water enters the outlet-pipe 18 and, rising up into the stand-pipe 19, flows out through the bent end thereof. In its passage through the heater the water circulates spirally through both the vertical and horizontal water-heating sections and, starting at the lowest point of the vertical section, passes out at a point above the water-level of the heater. It will be noted that the water enters the section *a* at its outer spiral passage and is discharged about centrally into the inner spiral passage of the section *b*, that from the outer spiral passage of section *b* it is discharged into the outer spiral passage of section *c*, and from about the center of section *c* it flows into the inner spiral passage of section *d*. Thus it will be seen that the water in passing through the heater is subjected to the action of the heat for a much longer period of time than is usual in this class of heaters. Any desired number of the horizontal sections may be employed.

Instead of connecting the stand-pipe with the outlet-pipe 18 and running it up on the outside of the heater the outlet-pipe may be dispensed with and a stand-pipe 22', leading from the upper side of the section *d* up through the dead-space 23' in section *b* and out through the casing 3 above the water-line, may be employed, as shown by dotted lines in Fig. 1.

By the term "dead-space" is meant that portion of the spirally-shaped water-passage of section *b* wherein the water remains comparatively quiet.

In the modification shown in Fig. 2 the horizontal water-heating sections are of a slightly-modified construction, being alternately convexo-concave and concavo-convex in form, and the flow of the water is reversed, being upward instead of downward. This form of heater being a circulating-heater is especially adapted for connection with a boiler or tank or wherever a circulating-heater is needed. In this modified form five horizontal water-heating sections *e*, *f*, *g*, *h*, and *i* are employed. The upper and lower sections and the central section are of the same construction, being approximately the same diameter as the interior of the shell 4 or vertical section and formed with a central opening 24 the same as in the other form for the passage of the products of combustion. The two alternate sections *f* and *h* are of less diameter than the interior of said vertical section, so that passages 25 similar to passages 12 may be formed for the ascending products of combustion between the outer edges of said sections and the inner wall of the vertical section. The inflowing water circulates through the spiral passage of the vertical section until it reaches the pipe 26, which communicates with the lower horizontal section *e*, at which point it divides, a part flowing up through the vertical section and the other part through said lower section, then through section *f* by way of the communicating pipe 27, thence through section *g* by way of pipe 28, thence through section *h* by way of pipe 29, thence through section *i* by way of pipe 30, and thence through pipe 31 into the last upper spiral passage but one of the vertical section, where it joins the flow that circulates around through the spiral passage of said vertical section. The circulation of the water in the horizontal sections is greatly facilitated by the inclination of the spiral passages, which is in the direction of the flow of the water. The water passes out through the outlet-pipe 32 at substantially the highest point of the vertical section. The vertical and horizontal water-heating sections of this modified form of heater are preferably made of cast metal, and the plates forming each section are bolted together at their outer edges, as shown. For ordinary purposes—such as heating water for baths, for use in saloons, &c.—the various sections may be constructed of sheet metal and the spiral passages formed by grooving.

Various modifications may be made in the detail construction of my invention without changing the principle thereof or sacrificing its spirit, and it will be noted that by detachably securing together the plates forming the horizontal sections said sections may be readily taken out of the heater and the scale removed therefrom.

Having thus fully described my invention, what I claim, and desire to secure by Letters Patent, is—

1. In a water-heater, the combination with the vertical water-heating section, forming the wall of the combustion-chamber, of two series of horizontal water-heating sections, the sections of one series alternating with those of the other series, said sections being so formed and arranged as to cause the products of combustion to pass through the sections of one of the horizontal series, and between the sides of the other horizontal series and the said vertical sections, all of the sections being in communication with one another, a valve-controlled inlet and a hot-water outlet, the draw-off pipe of said outlet being at substantially the highest point of the heater.

2. In a water-heater, the combination with the spirally-passaged vertical water-heating section, having a water-inlet at its lowest point, of two series of spirally-passaged horizontal water-heating sections, the sections of one series alternating with those of the other series, said sections being so formed and arranged as to cause the products of combustion to pass through the sections of one of the horizontal series and around and over the outer edge of the other horizontal series, all of the sections being in communication with one another, and a hot-water outlet, the draw-off pipe of which being at substantially the highest point of the heater.

3. In a water-heater, the combination with the vertical water-heating section, forming the wall of the combustion-chamber, having a water-inlet at its lowest point and a hot-water outlet at substantially its highest point, of two series of horizontal water-heating sections, the sections of one series having convexo-concave heating-surfaces and the other series having concavo-convex heating-surfaces, arranged alternately with each other, said sections being so formed and arranged as to cause the products of combustion to pass through the sections of one of the horizontal series and around and over the outer edge of the other horizontal series, all of the sections being in communication with one another.

4. In a water-heater, the combination with the vertical water-heating section, forming the wall of the combustion-chamber, of two series of horizontal water-heating sections, the sections of one series having convexo-concave heating-surfaces and the other series having concavo-convex heating-surfaces, arranged alternately with each other, said sections being so formed and arranged as to cause the products of combustion to pass through the sections of one of the horizontal series and around and over the outer edge of the other horizontal series, all of the sections being in communication with one another, but the lower horizontal section being in communication with the vertical section at a point where the water will be caused to divide, a part flowing through the horizontal sections and the vertical section at a point where it is joined by the other part flowing up through said vertical section, a valve-controlled inlet and a hot-water outlet, the draw-off pipe of which being at substantially the highest point of the heater.

5. In a water-heater, the combination with the spirally-passaged vertical water-heating section, having a water-inlet at its lowest point and a hot-water outlet at substantially the highest point thereof, of two series of spirally-passaged horizontal water-heating sections, the sections of one series having convex-concavo heating-surfaces and the other series having convexo-concave heating-surfaces, arranged alternately with each other, said sections being so formed and arranged as to cause the products of combustion to pass through the sections of one of the horizontal series and around and over the outer periphery of the other horizontal series, all of the sections being in communication with one another, a communication between the lower horizontal section and the vertical section, whereby the inflowing water is caused to divide one part flowing through the horizontal sections and the other part through the vertical sections, both parts uniting at the upper portion of said vertical section, and a draw-off pipe at substantially the highest point of the heater.

6. In a water-heater, the combination with the vertical water-heating section, forming the wall of the combustion-chamber, of two series of horizontal water-heating sections, the sections of one series having convexo-concave heating-surfaces and the other series having concavo-convex heating-surfaces, arranged alternately with each other, said sections being so formed and arranged as to cause the products of combustion to pass through the sections of one of the horizontal series and around and over the outer periphery of the other horizontal series, all of the sections being in communication with one another, a communication between the lower horizontal section and the vertical section, whereby the inflowing water is caused to divide, one part flowing through the horizontal sections and the other part through the vertical sections, both parts uniting at the upper portion of said vertical section, and a draw-off pipe at substantially the highest point of the heater.

7. In a water-heater, the combination with a spirally-passaged vertical water-heating section and two or more spirally-passaged horizontal water-heating sections, all of the horizontal sections being in communication with one another, a communication between the lower horizontal section and the vertical section, whereby the inflowing water is caused to divide, one part flowing through the horizontal sections and the other part through the vertical section, and a draw-off pipe for all sections, substantially as specified.

In testimony whereof I affix my signature in the presence of two witnesses.

THOMAS PATTISON.

Witnesses:
J. W. BARNESBERG,
JUAN AVILA.